Figure 1:
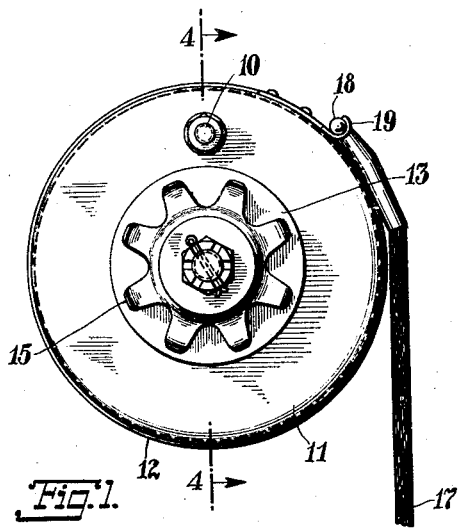

Oct. 20, 1931.    E. SLADE    1,828,549
SHOCK ELIMINATOR
Filed April 14, 1927    2 Sheets-Sheet 1

INVENTOR.
Edward Slade
BY
ATTORNEYS.

Oct. 20, 1931.                 E. SLADE                 1,828,549
                           SHOCK ELIMINATOR
                        Filed April 14, 1927        2 Sheets-Sheet 2
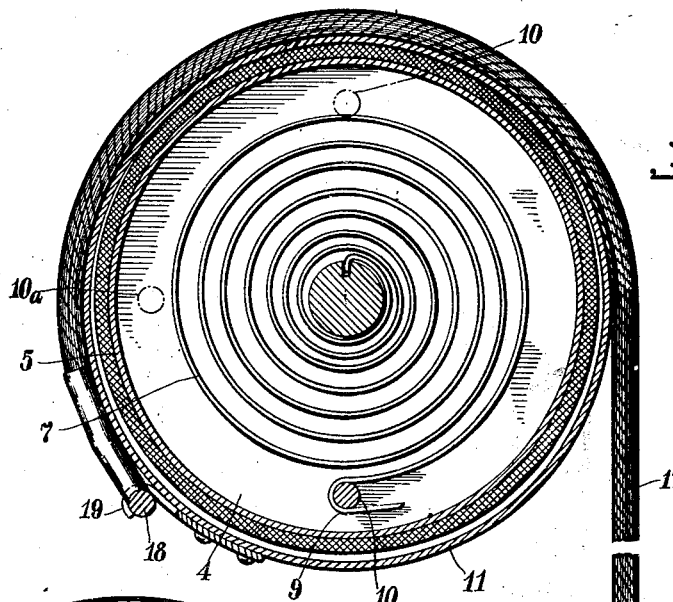
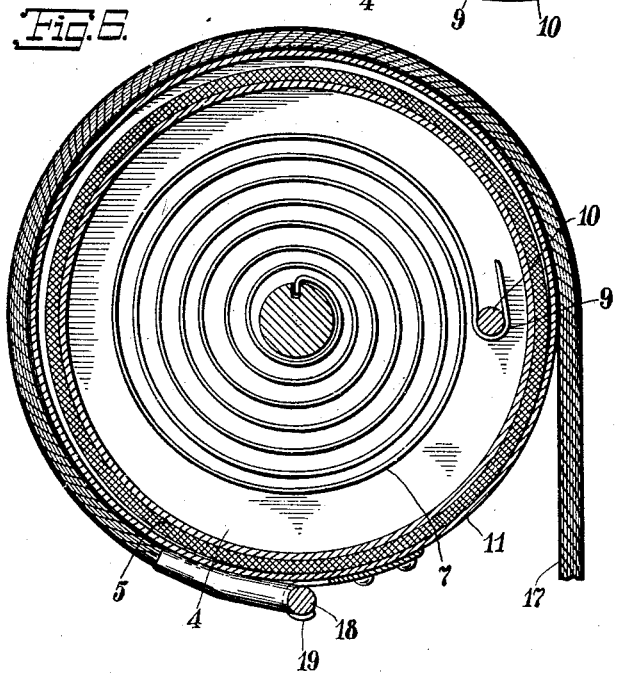
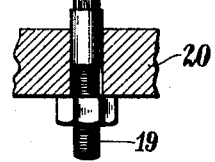
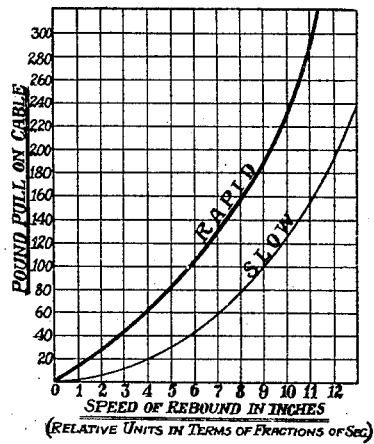
INVENTOR.
Edward Slade
BY
ATTORNEYS.

Patented Oct. 20, 1931

1,828,549

UNITED STATES PATENT OFFICE

EDWARD SLADE, OF NEW YORK, N. Y., ASSIGNOR TO MARSHALL ASBESTOS CORPORATION, OF TROY, NEW YORK, A CORPORATION OF DELAWARE

SHOCK ELIMINATOR

Application filed April 14, 1927. Serial No. 183,743.

My invention relates to the type of device wherein friction is employed to reduce the shock resulting from the rapid and abrupt movements imparted to a movable body, and more particularly to the vertical movements imparted to a vehicle body, when, for instance, the wheels of the vehicle pass over a rut or bump in a roadway. My invention, however, is applicable to any moving object, apparatus, machine, vehicle or other body subject to shock while in operation and having movements such as are ordinarily imparted to apparatus or machines of various types, or the customary traveling movement of vehicles. In describing my invention, however, I will refer specifically to its use on vehicles and more particularly to motor driven vehicles.

The object of my invention is to provide a device of that type wherein the shock is eliminated or prevented by a gradual braking action which is self-adjusting to the degree, speed and power of shock producing movements, rather than by a direct braking, absorbing or snubbing action as is the case in devices of this character heretofore employed for overcoming the effects of rapid and abrupt movements imparted to movable bodies in passing over or striking obstructions, ruts, or other impediments which may suddenly impede or retard the normal or smooth sliding or rolling motion of such bodies.

To accomplish the object of my invention I employ a device which operates on the principle of a friction brake, and is so arranged that it will function with a lower or higher coefficient of friction according to the speed, degree and power of the shock producing movements. In other words, when the shock producing movements are slow and tending to produce slight shocks, the action of my device is such that the braking element takes hold more slowly, that is, for a given degree of movement, the relative movement of the brake members upon each other is slower, with slight changes in spring pressure, and hence the coefficient of friction will be proportionately lower. On the other hand, when the shock producing movement is very rapid, such for instance as is caused by a vehicle traveling at high speed over a narrow deep rut, then the braking element will be caused to function with corresponding rapidity, greater degree of movement of the drum and consequent increased spring tension, and therefore with a correspondingly higher coefficient of friction. Thus I employ a frictional braking device which is self-adjusting to the degree, speed and power of the shock producing movement.

A further object of my invention is to produce a device of this character which will be subject to the minimum of wear in operation and in which the proper functioning will not vary materially with the wear of co-acting parts or friction elements; also to produce such a device in which there will be no structurally loose parts, or parts becoming loose through wear, and causing noise when in operation; also to produce a device in which a simple "take-up" will readjust the device to compensate for wear; also to produce a device which will be practically weather and dust proof; also to produce a device whose parts are readily assembled, and one which may be readily mounted in operative position, adjusted or dismounted; and finally to produce such a device having as few parts as possible and of such form as to be produced by the most efficient manufacturing methods.

My improved shock eliminator consists essentially of a brake-wheel rigidly mounted upon a supporting member, a floating brake member or drum surrounding the brake-wheel and flexibly or resiliently connected to or carried by said supporting member, as by a flat spiral spring, and flexible pulling means connected to the drum for imparting rotary motion thereto in one direction. The supporting member, in practice, is rigidly mounted upon a part or member of an object, apparatus, machine, vehicle or other body, and the flexible pulling means, which may be a wire cable, chain or strap, is connected to another part or member of the object, apparatus, machine, vehicle or other body subject to shock under operating conditions, and this flexible connection is essentially taut, under initial tension, and adjustably secured either to said body or said drum; the initial tension being produced by pulling the cable for the purpose of making the connection to the body member, and thereby imparting partial rotation to the drum and placing the spiral spring of the floating brake element under tension. This tension may be further adjusted, increased or decreased, by means of an adjustable take-up nut by means of which the cable is anchored at either end. The diameter of the brake wheel is slightly less than that of the inner surface of the drum so that the drum, due to the pulling action of the cable, will be in frictional engagement with the brake wheel only over a small arc, and as the drum is rotated in one direction by the pull of the cable (which increases the spring tension) or in the opposite direction by the recoil of the spring, the drum in rotating on the brake wheel will have a sliding action with a varying degree of friction.

One of the advantages in having a braking action which is self-adjusting to the degree, speed and power of the shock producing movement is that one size or type shock eliminator according to my invention will serve for any one kind of use. That is to say, in shock eliminators for motor vehicles, for instance, only one size or type will be necessary to meet the requirements for any size or make of vehicle. This is due to the self-adjusting braking or retarding action of my device, whereby the coefficient of friction is variable directly with the degree, speed and power of the shock producing movement. A further feature of my improved shock eliminator is that the flexible pulling member such as a wire cable, is wound on the exterior of the floating drum which also serves as the casing of the device, thereby avoiding the use of open casings for admitting the strap to a winding drum as commonly employed in shock absorbers as heretofore made, and thus I am enabled to utilize a closed floating drum and protect the friction elements from the action of weather, dust, etc. Furthermore, by applying the pulling member for the floating drum on the exterior of the casing a much wider latitude for adjustment is obtained to meet the varying requirements of spring tension in different makes or weights of motor vehicles. A further advantage obtained by placing the pulling element on the exterior of the casing is that any length of cable may be employed to meet varying structural conditions in different makes or types of motor vehicles. The functioning of these elements and the operation of the device will be described more in detail hereinafter.

Figure 3:
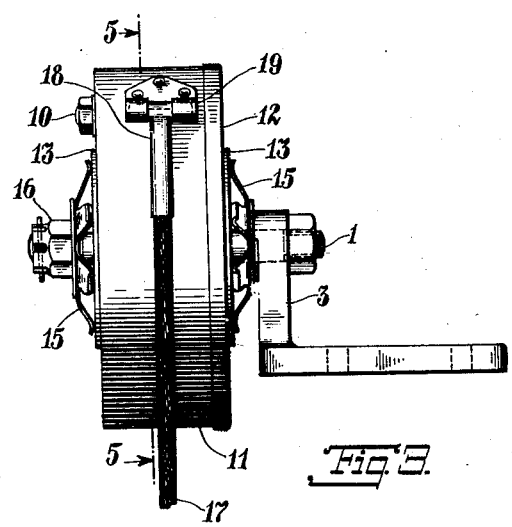
Figure 2:
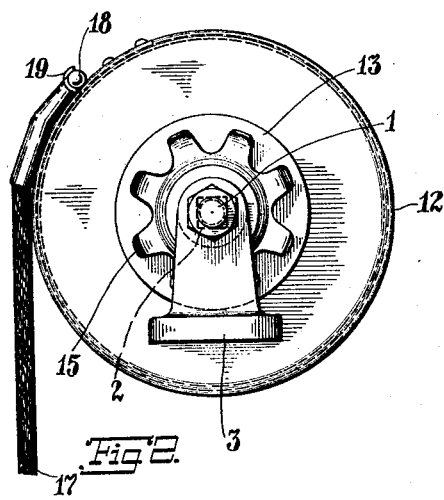
Figure 4:
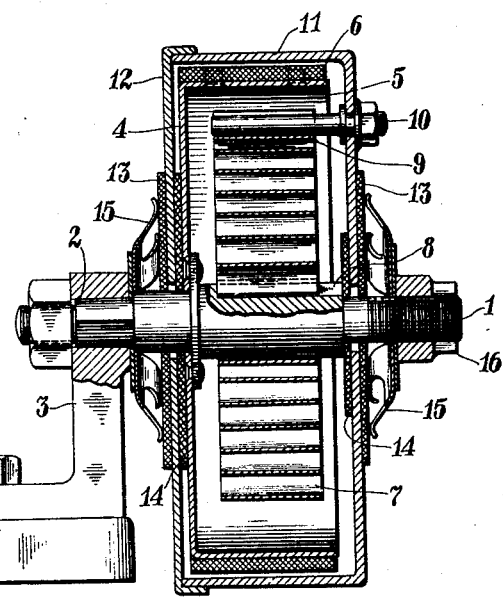

My invention is illustrated in the accompanying drawings in which, Figures 1 and 2 are elevations of opposite sides of the device; Figure 3 an edge view looking at the right of Figure 1; Figure 4 an enlarged vertical section through Figure 1 looking in the direction of the arrows and illustrating the position of the parts when not under tension; Figures 5 and 6 vertical sections through Figure 3 looking in the direction of the arrows and on the same scale as Figure 4, illustrating two different positions of the parts with the spring under tension; Figure 5 showing the position of the parts when the spring is under its initial tension only and the brake members in the normal position, and Figure 6 showing a position of the brake members when a shock producing movement imparted to a vehicle body takes place and the slack in the pulling cable is taken up by the brake drum rotating counter clock-wise through the recoil of the spring; and Figure 7 is a chart showing approximate coefficient of friction curves for rapid and slow shock producing movements.

Referring to the drawings, and more particularly to Figure 4, the supporting member 1 is represented as a spindle having a squared end 2 seated in a square hole in bracket 3. This bracket in practice will be of a shape adapted for clamping to the chassis of a motor vehicle. The brake-wheel which may be in the form of a pressed steel circular box has a web 4, flange 5 and asbestos or other friction material 6 wrapped entirely around the outer periphery of the flange and secured thereto in any suitable manner. The center of the web 4 is perforated to fit closely on spindle 1 and is riveted or otherwise rigidly or permanently secured to a flange which may be formed on the spindle or on a hub fitting on the spindle, but in either case fixed on the spindle, so that the brake-wheel will remain stationary upon the supporting member. The purpose in making the brake-wheel of box-like form is to house the flat spiral spring 7. This spring at its inner end has a short sharp bend for engaging a slot 8 in the spindle 1 or brake wheel hub, and the outer end is formed into a hook 9. This hook engages a pin 10 projecting from the web of the brake-drum 11. The brake-drum is a pressed steel box having a tight fitting cover 12 with central perforations for spindle 1 of such diameter as to permit ample movement of the drum perpendicular to the spindle. The apertures in the drum are closed by heavy stiff fibre washers 13 on the exterior of the drum and 14 on the interior, all of which fit closely on spindle 1. These washers may be of any other material, but preferably should have friction reducing, non-rusting and noiseless qualities. The drum is held in spaced relation to the brake-wheel by the interior washers 14, on the left hand side by reason of the washer being located between web 4 and cover 12 and on the right hand side by reason of the washer being located between the brake-wheel hub and the web of drum 11. The frictional contact between the brake-wheel, drum-web and cover is adjusted by means of spring disks 15 and nut 16 on the outer end of the supporting spindle. From the foregoing description and by reference to Figure 4 it will be observed that the brake-drum casing is held in fixed lateral relation to the brake-wheel but is free to move radially in all directions in accordance with the combined force of spring 7 and the pull of cable 17, which is not shown in Figure 4. The pulling member, cable 17, is provided with an anchor 18 for detachably engaging a bifurcated hook 19 riveted or otherwise secured to the drum 11, and the other end of the cable is provided with a screw threaded ferrule and nut 19 for adjustably securing the cable to a shackle or other plate 20, Figure 5, whereby connection is made, in the case of a motor vehicle, with a shackle on a spring or axle.

Referring now to Figure 5, it will be observed that the brake-drum has been rotated 180 degrees from the position shown in Figure 4, or from the position shown by the dotted circle 10 which indicates the position of pin 10 in Figure 4, and which position as above stated is the position of the brake-drum before placing the spring 7 under initial tension. The normal initial tension of the spring may be set according to the weight of the vehicle and this will be approximately a tension due to a rotation of the drum 180 degrees in adjusting the cable. To increase the tension slightly beyond that indicated in Figure 5, the cable may be further taken up by adjusting nut 19, which will rotate the drum clock-wise a corresponding distance. If a greater increase is desired, I prefer to obtain the adjustment by resetting the supporting spindle 1 in the bracket by removing the nut, withdrawing the spindle from the bracket, reinserting the spindle after giving it a quarter turn, counter clock-wise, and then locking the spindle in position. This resetting would carry the hooked end 9 of spring 7 and pin 10 backward to a point indicated by the dotted circle 10a and then when the cable is drawn downward to engage its end with the shackle-plate 20 the hooked end of the spring and pin 10 would again be at the point shown in Figure 5 with an initial tension due to a turn of 270 degrees. Then if desired the tension may be further modified, to increase or decrease same, by adjustment at the shackle-plate 20. This method of adjustment by resetting the spindle 1 may also be employed to compensate for wear of the asbestos brake-wheel facing.

It will be observed that in Figure 5 the line of contact between the brake-wheel and drum is at the top. This is due to the counter clock-wise pull of spring 7 tending to wind the cable on the drum, and the latter being free to move radially, is drawn downward against the fixed brake-wheel. When the vehicle springs are flexed due to any cause and the body upon which the brake-wheel and drum are mounted moves downward, cable 17 becomes slack and drum 11 is free to rotate toward the position indicated in Figure 6 under the pull of spring 7. During such movement of the vehicle body the pull of spring 7 as it recoils will rotate the brake-drum counter clock-wise with a combined rolling and sliding action on the brake-wheel until the cable becomes taut and holds the drum against further rotation, and thus the line of contact between the drum and brake-wheel will be transferred to an arc lying approximately between hook 18 and pin 10 as indicated in Figure 6. As the vehicle body moves upward due to the rebound of its springs, the upward movement of the brake-wheel and drum produces a pull on the cable, equivalent to pulling the cable through the shackle 20, and this pull rewinds spring 7 by rotating drum 11 in a clock-wise direction from the position of Figure 6 toward the position of Figure 5. This pull of the cable causes a rolling and sliding effect of the drum on the brake-wheel with gradually increasing friction as the tension of the spring is increased resulting in a gradual slowing up of the upward movement of the vehicle body and thereby causing the vehicle springs to act in a normal manner and eliminating the shock which would otherwise result. Thus it will be seen that the action of my shock eliminator is self-adjusting and that the coefficient of friction is at all times controlled by and variable according to the degree, speed and power of a shock producing movement.

In Figure 7 I show a chart with two curves which represent the variations in the coefficient of friction in the operation of my device under rapid and slow shock producing movements. In this chart the horizontal lines represent the pull of the cable in pounds and the vertical lines represent the speed of rebound in inches. From this chart it will be observed that upon a rapid rebound the coefficient of friction increases gradually with the pull, speed and degree of rebound, and that with a slow rebound the rise in the coefficient of friction is much slower.

From the foregoing it will be noted that my improved shock eliminator embodies all the objects of my invention, especially in that it is self-adjusting to varying shock producing movements to effect gradual checking; the braking elements are housed within a closed casing; the moving parts are noiseless since all are subject to spring pressure thereby insuring against possible rattling due to wear in operation; the entire assembly of parts is held by one nut which is locked in position; with the exception of the spindle, pin and nuts the parts are all punch and press work; furthermore, there is no point at which a sudden jerk on the cable is not met with an elastic resistance; and locking or seizing of the brake elements is impossible as the resistance to shock is a sliding coefficient of friction between the drum and brake-wheel.

What I claim is:

1. A shock eliminator comprising a supporting member, a pulling member, and a friction member intermediate the supporting and pulling members, said friction member comprising a fixed drum and a rotary drum, one working within the other, the rotary drum having a diameter permitting radial movement relative to the fixed drum, and a coiled spring connected between said drums for producing relative angular movement in a direction opposite to that of the pulling member, whereby the angular movements resulting from the pull of the spring in one direction and the pull of the pulling member in the opposite direction will produce a change in radial position of the rotary drum relative to the fixed drum and a consequent change in the coefficient of friction at either end of the movement, and a gradually varying coefficient during the rotation of the drum due to the gradually changing radial position thereof.

2. A shock eliminator comprising a supporting member, a friction member having a fixed drum and a rotary drum, one working within the other and the rotary drum having a diameter permitting engagement with the fixed drum both by rolling and slipping contact, a pulling member connected with the rotary drum, and a coiled spring connected between said drums for producing relative rotary movement in a direction opposite to that imparted by the pulling member, whereby the rotary movements resulting from the pull of the spring in one direction and the degree of movement imparted by the pulling member in the opposite direction will produce changes in the radial position of the rotary drum relative to the fixed drum with consequent changes in coefficient of friction at either end of the movement, and a gradually varying coefficient during the rolling and slipping of the rotary drum due to the gradually changing radial position relative to the fixed drum.

3. A shock eliminator comprising a supporting member, a friction member having a fixed drum, mounted on said supporting member, and a rotary drum surrounding the fixed drum, the rotary drum having a diameter permitting engagement with the fixed drum both by rolling and slipping contact, a pulling member engaging the outer periphery of the rotary drum, and a coiled spring within and connected between said drums for imparting angular movement to the rotary drum in a direction opposite to that imparted by the pulling member, whereby the rotary movements resulting from the pull of the spring in one direction and the degree of movement imparted by the pulling member in the opposite direction will produce changes in the radial position of the rotary drum relative to the fixed drum with consequent changes in coefficient of friction at either end of the movement, and a gradually varying coefficient during the rolling and slipping of the rotary drum due to the gradually changing radial position relative to the fixed drum.

4. A shock eliminator having in combination a stationary supporting member, a brake-wheel having a fixed position thereon, a spiral spring within said wheel having its inner end connected to said support, a brake-drum surrounding said wheel and to which the other end of said spring is connected, said drum being mounted upon said support so as to be capable of rotary and radial movement with respect to said wheel, said drum being of box-like form with a tight fitting cover enclosing said wheel and spring, and a flexible pulling member wound upon the periphery of said drum and having one end detachably connected thereto and the other end adapted for adjustable connection to a relatively stationary element.

5. A shock eliminator having in combination a stationary supporting member, a brake-wheel having a fixed position thereon, and having a wide circumferential flange faced with friction material, a spiral spring within said wheel having its inner end connected to said support, a brake-drum surrounding said wheel and to which the other end of said spring is connected, said drum being mounted upon said support so as to be capable of rotary and radial movement with respect to said wheel, said drum being of box-like form with a tight fitting cover enclosing said wheel and spring, and a flexible pulling member wound upon the periphery of said drum and having one end detachably connected thereto and the other end adapted for adjustable connection to a relatively stationary element.

6. A shock eliminator having in combination a supporting spindle rigidly mounted upon a bracket, a brake-wheel of box-like form mounted upon said spindle and rigidly secured thereto, a spiral spring within said wheel having its inner end connected to said spindle, a brake drum of box-like form having a tight fitting cover enclosing said brake-wheel and spring, a pin projecting from one side of said drum for engaging the outer end of said spring, central perforations in the walls of said drum through which said spindle passes, outer and inner washers closely fitting said spindle for closing said perforations in the drum and for spacing said drum and brake-wheel, spring metal disks on said spindle bearing against the outer washers, and an adjustable lock-nut on said spindle for retaining all said parts in spaced frictional relation on said spindle.

7. A shock eliminator having in combination a supporting spindle rigidly mounted upon a bracket, a brake-wheel of box-like form mounted upon said spindle and rigidly secured thereto, a spiral spring within said wheel having its inner end connected to said spindle, a brake drum of box-like form having a tight fitting cover enclosing said brake-wheel and spring, a pin projecting from one side of said drum for engaging the outer end of said spring, central perforations in the walls of said drum through which said spindle passes, said perforations being of enlarged diameter so that said drum will be capable of both rotary and radial movement with respect to said brake-wheel, outer and inner washers closely fitting said spindle for closing said perforations in the drum and for spacing said drum and brake-wheel spring metal disks on said spindle bearing against the outer washers, and an adjustable lock-nut on said spindle for retaining all said parts in spaced frictional relation on said spindle.

8. A shock eliminator having in combination a stationary supporting member, a brake-wheel having a fixed position thereon, a brake-drum surrounding said wheel and mounted upon said support so as to be capable of rotary and radial movement with respect to said wheel, a spiral spring connected between said support and drum, and a pulling member having one end connected to said drum and its other end to a relatively stationary element.

9. A shock eliminator having in combination a stationary supporting member, a brake-wheel having a fixed position thereon, a spiral spring within said wheel having its inner end connected to said support, a brake-drum surrounding said wheel and to which the other end of said spring is connected, said drum being mounted upon said support so as to be capable of rotary and radial movement with respect to said wheel, and a flexible pulling member wound upon the periphery of said drum and having one end detachably connected thereto and the other end adapted for adjustable connection to a relatively stationary element.

10. A shock absorber comprising an inner fixed drum, an outer drum mounted for radial movement with respect to the same, friction material between the drums, a spring within the drum, tending to turn one about the other, a strap connected with the outer drum tending to turn it against the spring, in such a manner that as a pull is exerted on the strap the outer drum will be pressed towards one side of the inner drum causing resistance to rotation, due to the friction material.

This specification signed at New York city, this 9th day of April, 1927.

EDWARD SLADE.